United States Patent
Barnes et al.

(10) Patent No.: US 7,321,372 B2
(45) Date of Patent: Jan. 22, 2008

(54) METHOD FOR PERFORMING IMAGE EDITING

(75) Inventors: Forrest C. Barnes, Georgetown, KY (US); Khageshwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 123 days.

(21) Appl. No.: 11/230,194

(22) Filed: Sep. 19, 2005

(65) Prior Publication Data

US 2007/0064011 A1    Mar. 22, 2007

(51) Int. Cl.
*G09G 5/00* (2006.01)
(52) U.S. Cl. ..................................... 345/619
(58) Field of Classification Search ............. None
See application file for complete search history.

(56) References Cited

U.S. PATENT DOCUMENTS

| | | | |
|---|---|---|---|
| 4,868,020 A * | 9/1989 | Grosslight | 428/29 |
| 5,537,526 A | 7/1996 | Anderson et al. | |
| 5,990,906 A | 11/1999 | Hudson et al. | |
| 6,081,611 A | 6/2000 | Linford et al. | |
| 6,185,591 B1 | 2/2001 | Baker et al. | |
| 6,483,609 B1 * | 11/2002 | Ueno et al. | 358/434 |
| 6,523,134 B2 | 2/2003 | Korenshtein | |
| 6,527,812 B1 | 3/2003 | Bradstreet | |
| RE38,270 E | 10/2003 | Nakajima | |
| 6,704,467 B2 | 3/2004 | Uchida | |
| 6,738,075 B1 * | 5/2004 | Torres et al. | 715/723 |
| 6,865,300 B2 | 3/2005 | Kokemohr | |
| 2004/0210845 A1 * | 10/2004 | Paul et al. | 715/731 |
| 2004/0223747 A1 * | 11/2004 | Otala et al. | 386/125 |

* cited by examiner

*Primary Examiner*—Mark Zimmerman
*Assistant Examiner*—David Chu
(74) *Attorney, Agent, or Firm*—Taylor & Aust, PC

(57) ABSTRACT

A method for performing image editing includes displaying an image in a first state; saving the image in the first state; performing an operation to change the image to a second state from the first state, the second state being different from the first state; displaying the image in the second state; selecting from the displayed image in the second state a first area; and reversing the operation with respect to the first area to change the first area of the image back to the first state.

10 Claims, 8 Drawing Sheets

METHOD FOR PERFORMING IMAGE EDITING

BACKGROUND OF THE INVENTION

1. Field of the Invention

The present invention relates to imaging, and, more particularly, to a method for performing image editing.

2. Description of the Related Art

Modern software applications typically offer an undo operation. As the name suggests, the undo operation allows one to go back to a prior operation. The undo operation is very useful in recovering from mistakes, whether caused by the user or the application. Some applications also provide undo steps in which one can step backward a desired, integer number of operations. A problem exists, however, in that a traditional undo operation will undo both desirable and undesirable effects. In other words, the user is forced to keep all the changes or loose all the changes, which can be very frustrating, especially on a complicated project.

SUMMARY OF THE INVENTION

The present invention provides a reversal operation that may be partially, or selectively, applied to an image. The selective application of the reversal operation may be useful, for example, when a particular operation produces both desirable effects and undesirable effects simultaneously.

The invention, in one form thereof, is directed to a method for performing image editing. The method includes displaying an image in a first state; saving the image in the first state; performing an operation to change the image to a second state from the first state, the second state being different from the first state; displaying the image in the second state; selecting from the displayed image in the second state a first area; and reversing the operation with respect to the first area to change the first area of the image back to the first state.

The invention, in another form thereof, is directed to an imaging apparatus configured for performing image editing. The imaging apparatus includes a printing unit, an input device, a display screen, and a processor having an associated memory. The processor is communicatively coupled to the printing unit, the input device and the display screen. The processor executes program instructions to perform displaying an image in a first state on the display screen; saving the image in the first state in the memory; performing an operation to change the image to a second state from the first state, the second state being different from the first state; displaying the image in the second state on the display screen; selecting from the displayed image in the second state a first area using input data received from the input device; and reversing the operation with respect to the first area to change the first area of the image back to the first state.

The invention, in another form thereof, is directed to a method for performing image editing. The method includes displaying an image in a first state; saving the image in the first state; performing an operation to change the image to a second state from the first state, the second state being different from the first state; displaying the image in the second state; selecting a first area of the image in the second state; dividing the first area into a core region and a peripheral region, the peripheral region having an outer perimeter; replacing data in the core region with corresponding data of the image in the first state; replacing data in a first portion of the peripheral region adjacent to the core region completely with corresponding data of the image in the first state; and transitioning outward from the first portion of the peripheral region toward the outer perimeter of the peripheral region by replacing less and less data in the second state with corresponding data of the image in the first state until at the outer perimeter of the peripheral region data of the image in the second state is not replaced with corresponding data of the image in the first state, so as to produce a blending effect between the image in the first state and the image in the second state.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one or more embodiments of the invention, and such exemplifications are not to be construed as limiting the scope of the invention in any manner.

DETAILED DESCRIPTION OF THE INVENTION

Figure 1:
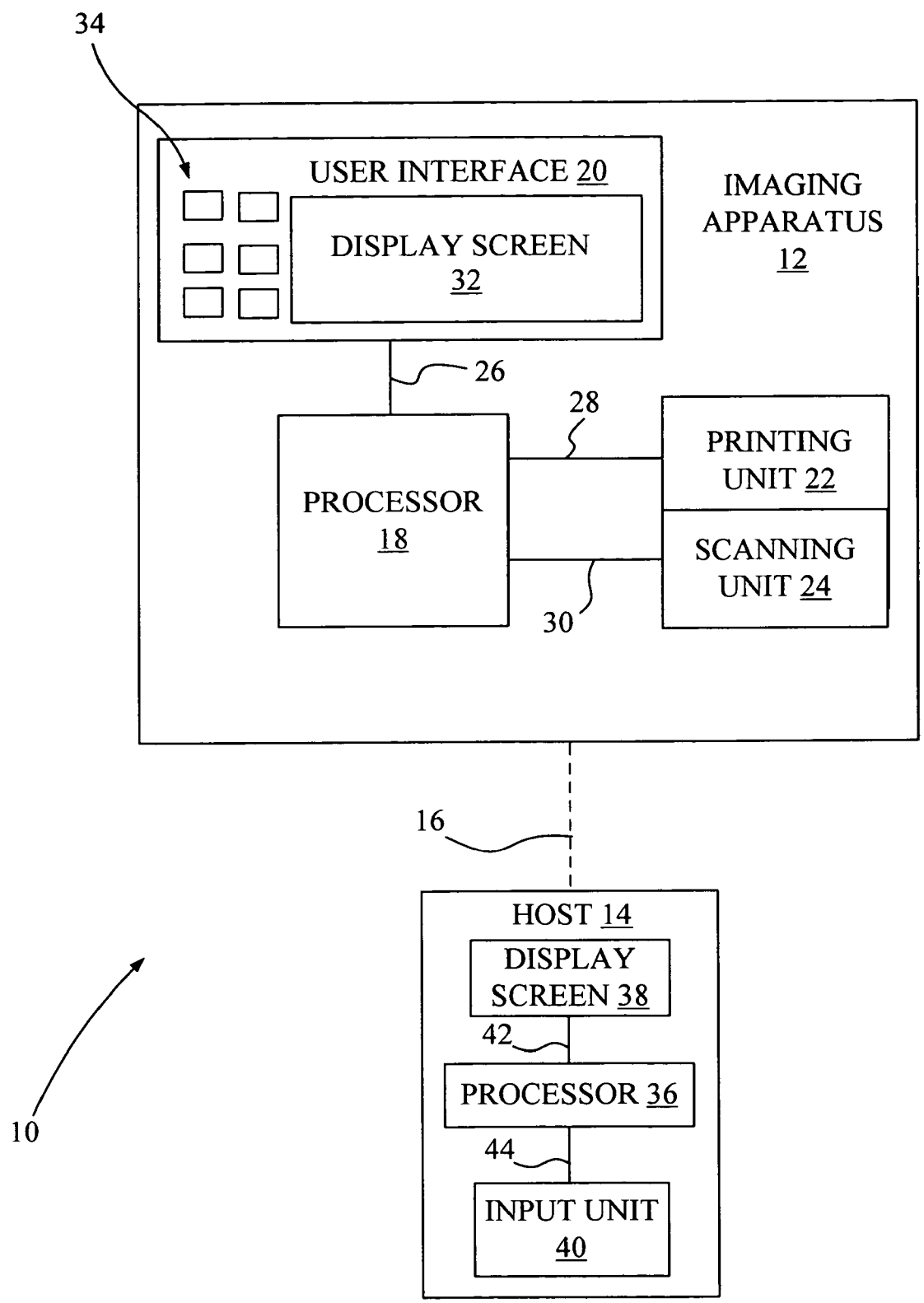
FIG. 1 is a diagrammatic representation of a system embodying the present invention.

Referring now to the drawings and particularly to FIG. 1, there is shown an imaging system 10 embodying the present invention. Imaging system 10 includes an imaging apparatus 12, and optionally, a host 14.

Imaging apparatus 12 may be, for example, a printer, or may take the form of a multi-function device (MFD), such as for example, a standalone unit that has scanning, copying, and/or faxing functionality, in addition to printing functionality. Host 14, which may be optional, may be communicatively coupled to imaging apparatus 12 via a communications link 16. Communications link 16 is depicted as a dashed line to represent the optional coupling of imaging apparatus 12 to host 14.

As used herein, the term "communications link" generally refers to structure that facilitates electronic communication between two components, and may operate using wired or wireless technology. Accordingly, communications link 16 may be, for example, a direct electrical wired connection, a direct wireless connection (e.g., infrared or r.f.), or a network connection (wired or wireless), such as for example, an Ethernet local area network (LAN) or a wireless networking standard, such as IEEE 802.11.

Imaging apparatus 12, as an MFD, includes a processor 18, a user interface 20, a printing unit 22, and a scanning unit 24.

Processor 18 of imaging apparatus 12 may be, for example, an application specific integrated circuit (ASIC) having processing capabilities, and may include a microprocessor and associated memory. Processor 18 is communicatively coupled to user interface 20 via a communications link 26. Processor 18 is communicatively coupled to printing unit 22 via a communications link 28. Processor 18 is communicatively coupled to scanning unit 24 via a communications link 30.

Processor 18 executes program instructions, in firmware or software, to provide operational control of printing unit 22. In some embodiments of imaging apparatus 12, such as for example where imaging apparatus 12 is a multifunction device (MFD), processor 18 may include in its memory a software or firmware program including program instructions that function as a driver for printing unit 22, and will be referred to herein as a driver program. The driver program, for example, may include a halftoning unit and a data formatter subroutine that places print data and print commands in a format that can be recognized by printing unit 22.

In addition, processor 18 executes program instructions to process job data for use by printing unit 22. The job data may include, for example, printing data generated as a result of executing program instructions to generate or modify an image, e.g., a digital photograph. Further, the job data may be data generated locally, such as by scanning unit 24, as when imaging apparatus 12 is operating in a standalone mode. Alternatively, the job data may be generated remotely, as when an imaging application is executed by host 14.

User interface 20 includes a display screen 32, and may further include a plurality of input devices 34. Display screen 32 may be, for example, a liquid crystal display (LCD). Display screen 32 may display, for example, a view of the imaging operation that is, or has been, performed. The plurality of input devices 34 may include, for example, a plurality of buttons, and/or a pointer device, such as a joystick or trackball. Each of the plurality of input devices 34 is communicatively coupled to processor 18 via communications link 26. Processor 18 executes program instructions to monitor each of the plurality of input devices 34 for actuation.

Printing unit 22 may be, for example, an ink jet print engine, or other suitable print engine for forming an image on a sheet of media, such as a sheet of paper. The print engine may be, for example, an ink jet print engine having a reciprocating printhead carrier for transporting one or more ink jet printheads for performing a printing operation, the operation of which is well known in the art.

Scanning unit 24 may include, for example, a scan bed for receiving a document to be scanned. For example, during a scanning operation the media to be scanned may be placed on the document glass of the scan bed, and a scan bar may be moved in relation to the object to form a scanned image of the object. The image may then be displayed for viewing or further processing on display screen 32.

In embodiments including host 14, host 14 may be, for example, a personal computer including a processor 36, a display screen 38 (e.g., a monitor device) and an input unit (e.g., keyboard, mouse, joystick, etc.) 40, and associated input/output (I/O) interfaces. Processor 36 may include, for example, a microprocessor and associated memory, such as RAM, ROM, NVRAM, and a mass data storage device, such as a hard drive, CD-ROM and/or DVD units.

Processor 36 is communicatively coupled to display screen 38 via a communications link 42. Processor 36 is communicatively coupled to input unit 40 via a communications link 44. Further, processor 36 is communicatively coupled to processor 18 of imaging apparatus 12 via communication link 16.

In embodiments that include host 14, host 14 may include in its memory all, or a portion, of the driver program including program instructions that function as a driver for imaging apparatus 12. The driver program, for example, may include a halftoning unit and a data formatter subroutine that places print data and print commands in a format that can be recognized by printing unit 22. The driver program may be accessed, for example, by a software application, such as for example, a photo editing application executing on host 14. A preview of a current operation may be displayed on display screen 32 of imaging apparatus 12 and/or on display screen 38 of host 14.

The present invention provides a reversal operation that may be partially, or selectively, applied to an image. The selective application of the reversal operation may be useful, for example, when a particular operation produces both desirable effects and undesirable effects simultaneously. One example of such an operation is the application of readily available software that performs an automatic red eye removal operation. While the automatic red eye removal operation often works reasonably well, it may not be completely accurate. When the automatic red eye removal operation fails with false positives, for example, the automatic red eye removal software creates very undesirable artifacts, such as dark spots, on the image.

Figure 2:
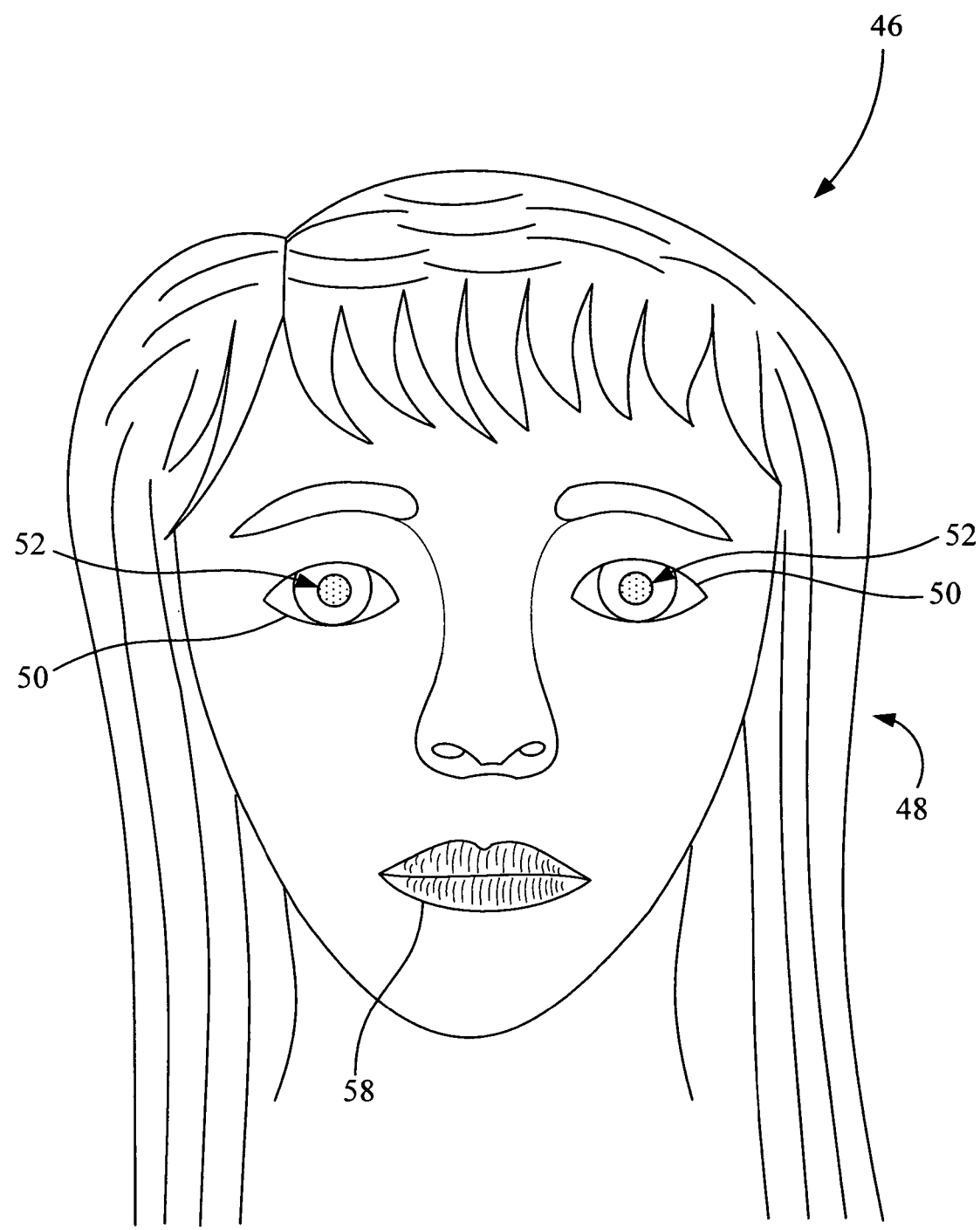
FIG. 2 shows an image in a first state, wherein the eyes in the image display undesirable red eye effects.
Figure 3:
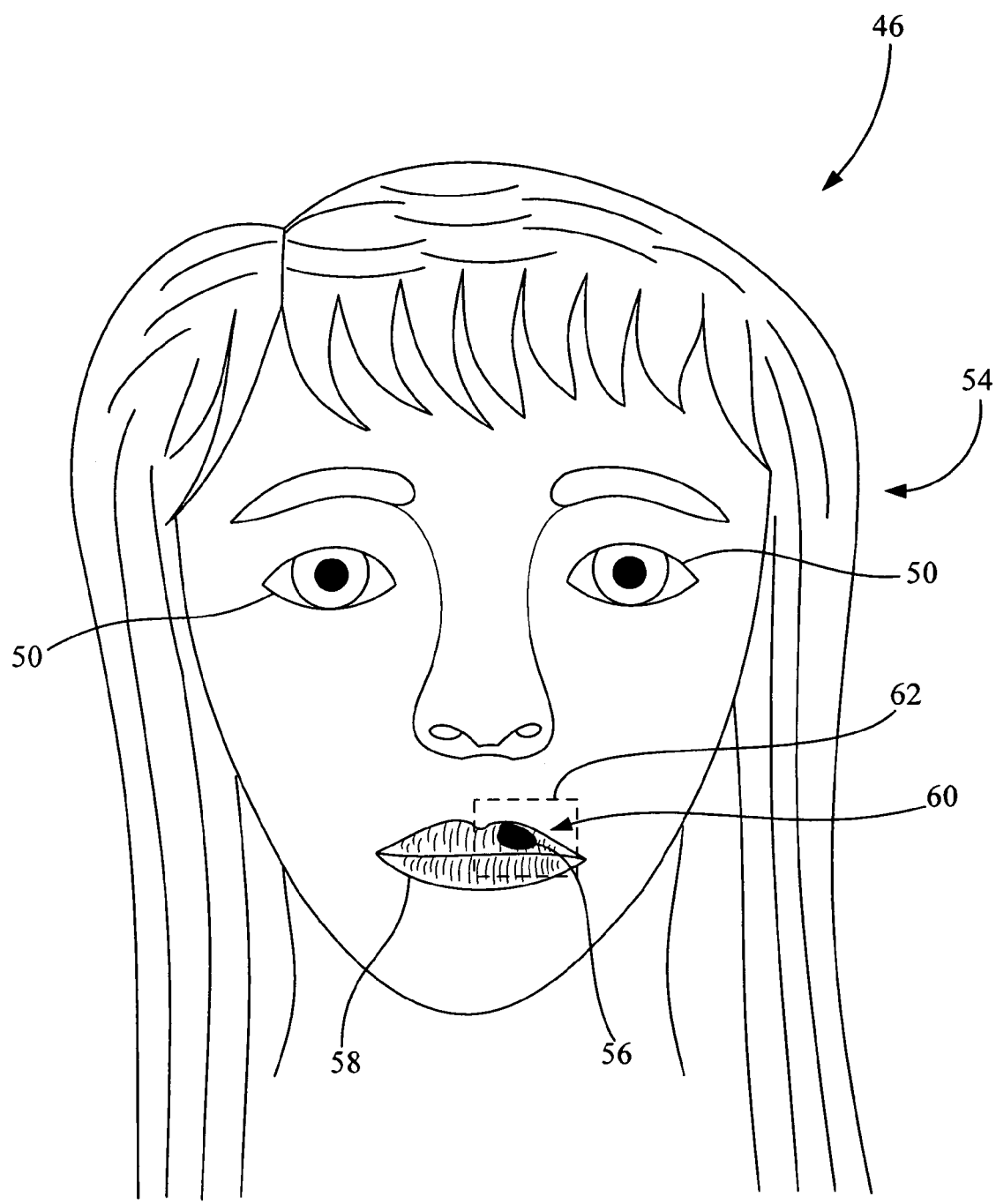
FIG. 3 illustrates the image in a second state following an application of standard automatic red eye removal software that performs an automatic red eye removal operation.

FIG. 2 shows an image 46 in a first state, i.e., original state, 48, wherein the eyes 50 in image 46 display undesirable red eye effects 52. FIG. 3 illustrates image 46 in a second state 54 following an application of standard automatic red eye removal software that performs an automatic red eye removal operation, which corrects, e.g., removes, the red eye effects 52 in the eyes 50 of image 46, but in this example also generates an undesirable artifact 56 in the form a dark spot on the lips 58 of image 46.

In accordance with the present invention, a reversal operation is performed that may be partially, or selectively, applied to an image having undergone an operation, as more fully described below. The selective application of the reversal operation may be useful, for example, when a particular operation, such as an automatic red eye removal operation, simultaneously produces both desirable effects, e.g., red eye removal, and undesirable effects, e.g., dark spots.

Figure 4A:
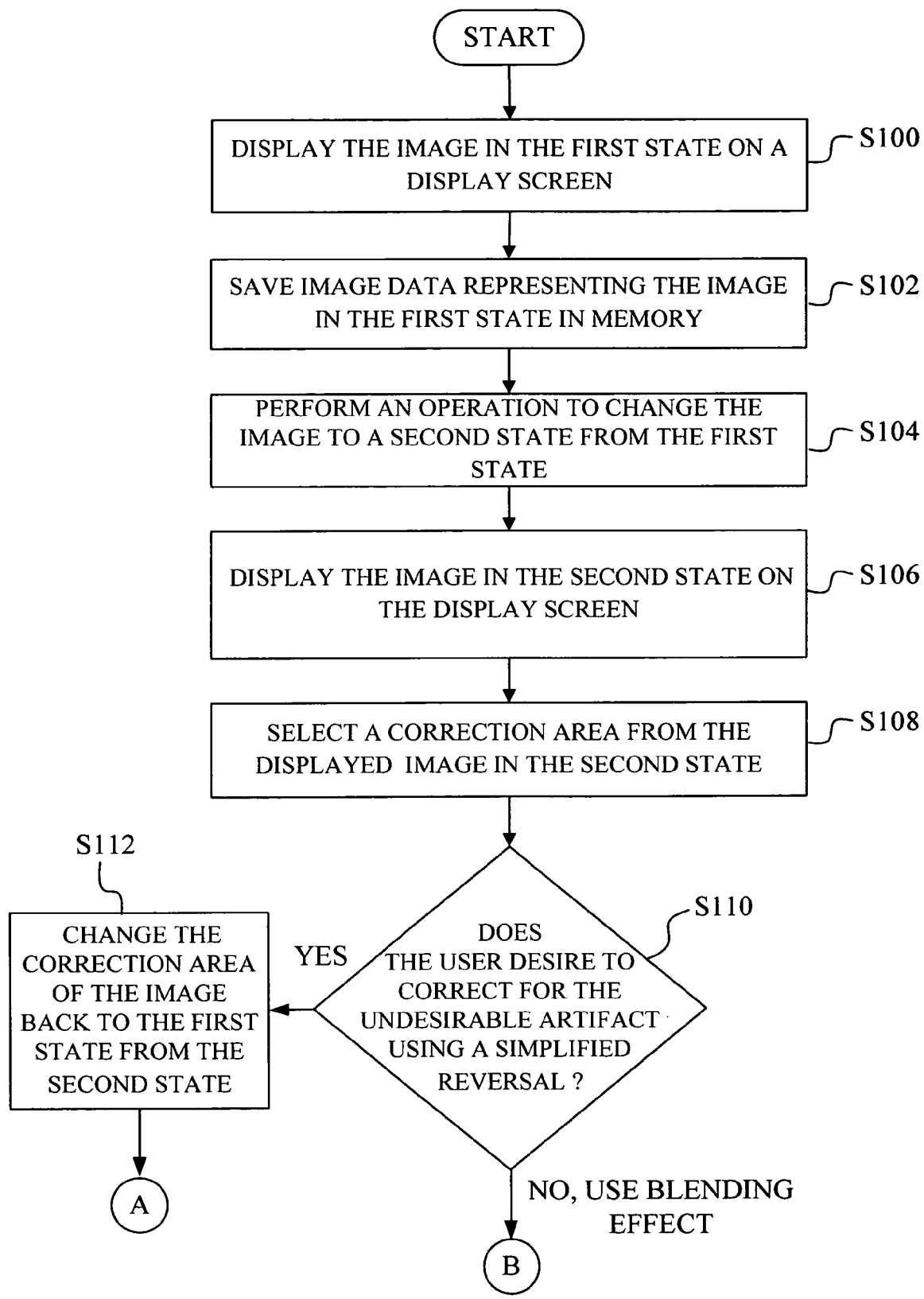
FIGS. 4A and 4B together form a general flowchart of a method for performing image editing, in accordance with the present invention.
Figure 4B:
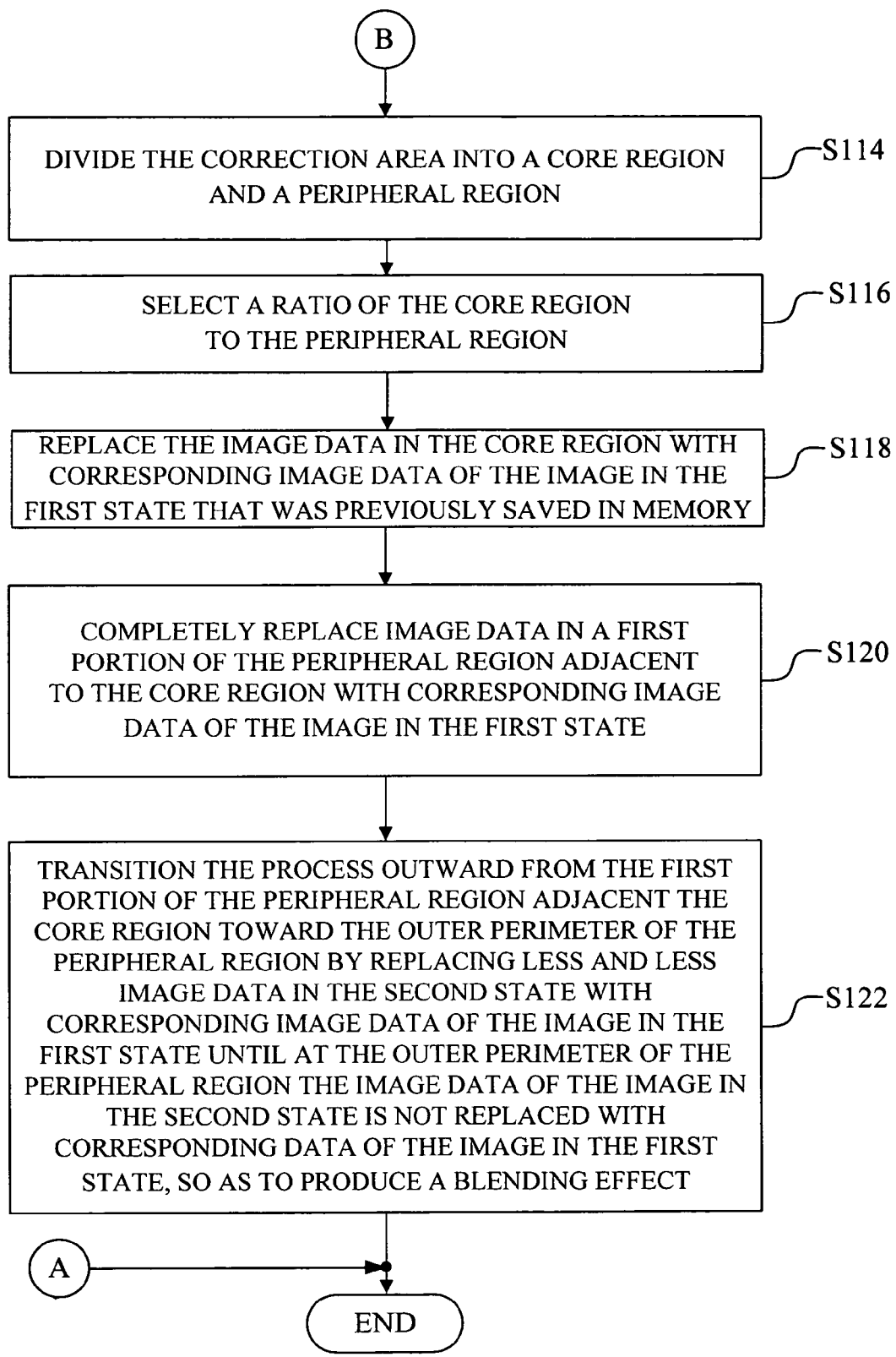

FIGS. 4A and 4B together form a flowchart of a method for performing image editing, which will be described below with reference to FIGS. 1-3 and 5. The method may be performed by executing program instructions that may be resident in firmware in imaging apparatus 12, or in software executing on imaging apparatus 12. Alternatively, in embodiments that include host 14, the method may be performed by executing program instructions that may be resident in firmware in imaging apparatus 12 and/or host 14, or in software executing on imaging apparatus 12 and/or host 14.

At step S100, image 46 is displayed in first state 48 (see FIG. 2) on a display screen, such as display screen 32 of imaging apparatus 12 and/or display screen 38 of host 14. Image 46 may be, for example, a photographic or graphical representation of an object, such as a human face. The first state 48 may be, for example, image 46 in its original state, prior to any enhancement.

At step S102, image data representing image 46 in first state 48 is saved in memory, such as memory associated with processor 18 of imaging apparatus 12 and/or processor 36 of host 14.

At step S104, an operation is performed to change image 46 to the second state 54 from the first state 48 (see FIG. 3). The second state 54 of image 46 is different from the first state 48 of image 46 as a result of performing the operation. The operation may be, for example, the red eye removal operation illustrated in FIGS. 2 and 3.

In comparing FIG. 2, representing image 46 in the first state 48, with FIG. 3, representing image 46 is the second, i.e., modified, state 54, there is considered to be a correspondence between the image data representing image 46 in the first state 48 and the image data representing image 46 in the second state 54, even though some of the image data will be different, e.g., after the red eye removal operation. Such correspondence may be, for example, a pixel-for-pixel correspondence.

At step S106, image 46 in the second state 54 is displayed on the display screen, such as display screen 32 of imaging apparatus 12 and/or display screen 38 of host 14. In FIG. 3 showing image 46 in the second state 54, it is noted that the red eye effects 52 have been successfully removed. However, as a result of the red eye removal operation, an undesirable artifact 56 in the form of a dark spot is now present on the lips 58 of the human face of image 46.

At step S108, a correction area 60 is selected from the displayed image 46 in the second state 54. In this example, the selected area will be a region including the undesirable artifact, e.g., dark spot, 56 on the lips 58 of the human face depicted by image 46, as shown in FIG. 3. The correction area 60 may be selected, for example, by drawing a window 62 on the display screen to represent the correction area 60. Window 62 may be drawn on display screen 32, for example, using one of the input devices 34. Alternatively, window 62 may be drawn on display screen 38, for example, using one of the input devices from input unit 40.

In the example shown in FIG. 3, window 62 has a rectangular shape. However, it is contemplated that the shape of window 62 may be of any geometric shape, e.g., a triangle, rectangle, etc., and may be round or oval, or include an arced portion. Also, it is contemplated that window 62 may have an arbitrary, e.g., irregular, shape, as in the case of a freehand draw window using a pointing instrument as an input device.

At step S110, it is determined whether the user desires to correct for the undesirable artifact, e.g., dark spot, 56 using a simplified reversal or a blended reversal. If the user desires a simplified reversal, the process continues to step S112.

At step S112, the operation conducted at step S104, e.g., the red eye reduction operation, is reversed with respect to only the correction area 60 to change the correction area 60 of image 46 back to the first state 48 from the second state 54. The act of reversing may include the sub-steps of extracting from memory a portion of the image data from the image 46 in the first state 48 that was saved that corresponds to the correction area 60, and the inserting the extracted portion of image data into correction area 60.

Figure 5:
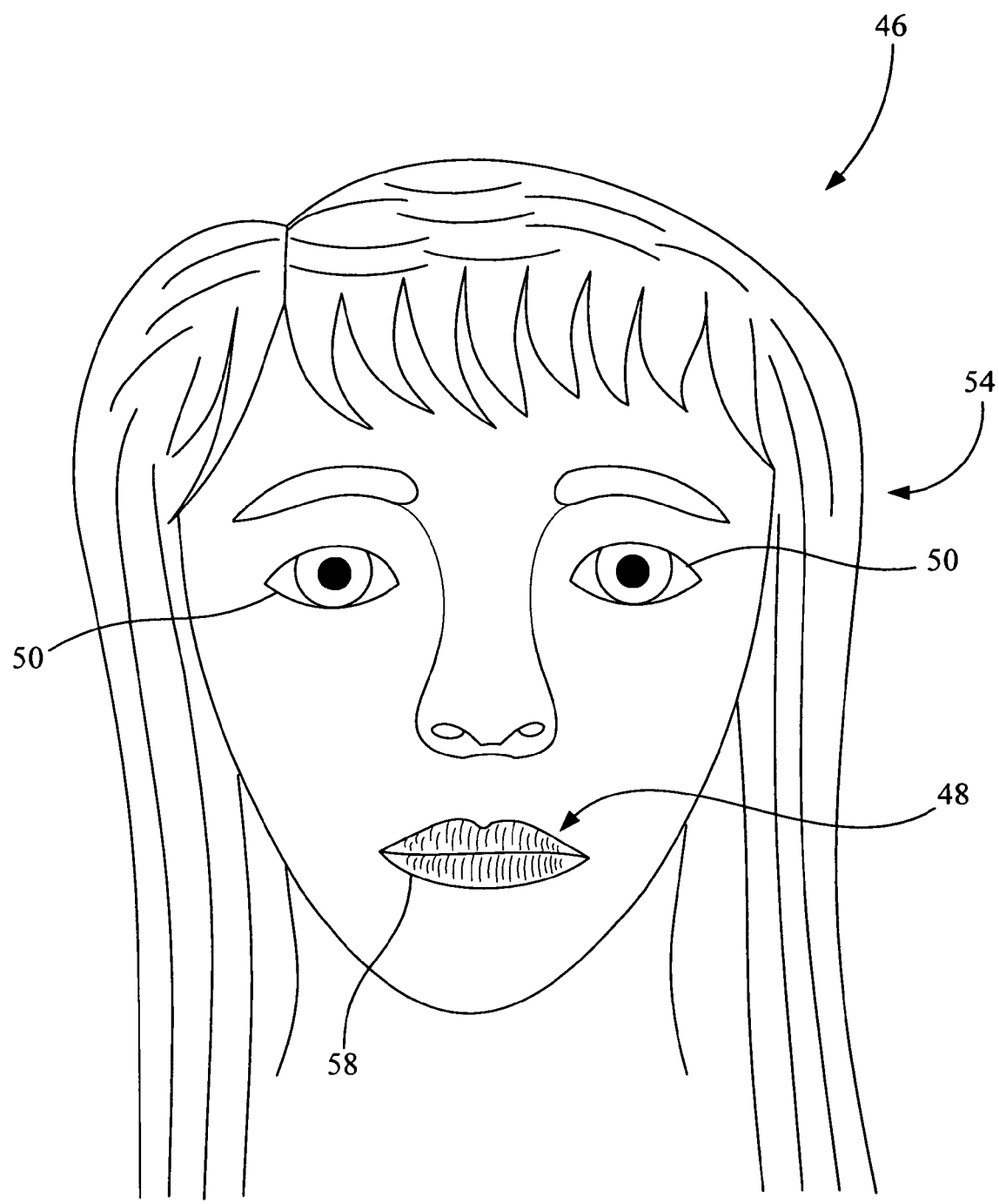
FIG. 5 illustrates an image, which includes the desirable red eye removal of FIG. 3 without the undesirable artifact generated by the red eye removal operation.

The result of this change is illustrated in FIG. 5, which includes the desirable red eye removal of FIG. 3 without the undesirable artifact 56 of FIG. 3. Thus, in the present example, the final form of image 46 is a combination of the correction area 60 with the corresponding portion of image 46 changed back to the first state 48 of FIG. 2 and at least a second area, e.g., the remaining area outside correction area 60, with the corresponding portion of image 46 remaining in the second state 54 of FIG. 3.

Referring again to step S110, if it is determined that the user desires to perform a blended reversal on correction area 60, the process proceeds to step S114. In general, a blended area may be formed such that in correction area 60 a transition occurs between the image 46 in the first state 48 and image 46 in the second state 54 in the second area, e.g., the remainder of the area outside correction area 60.

Figure 6:
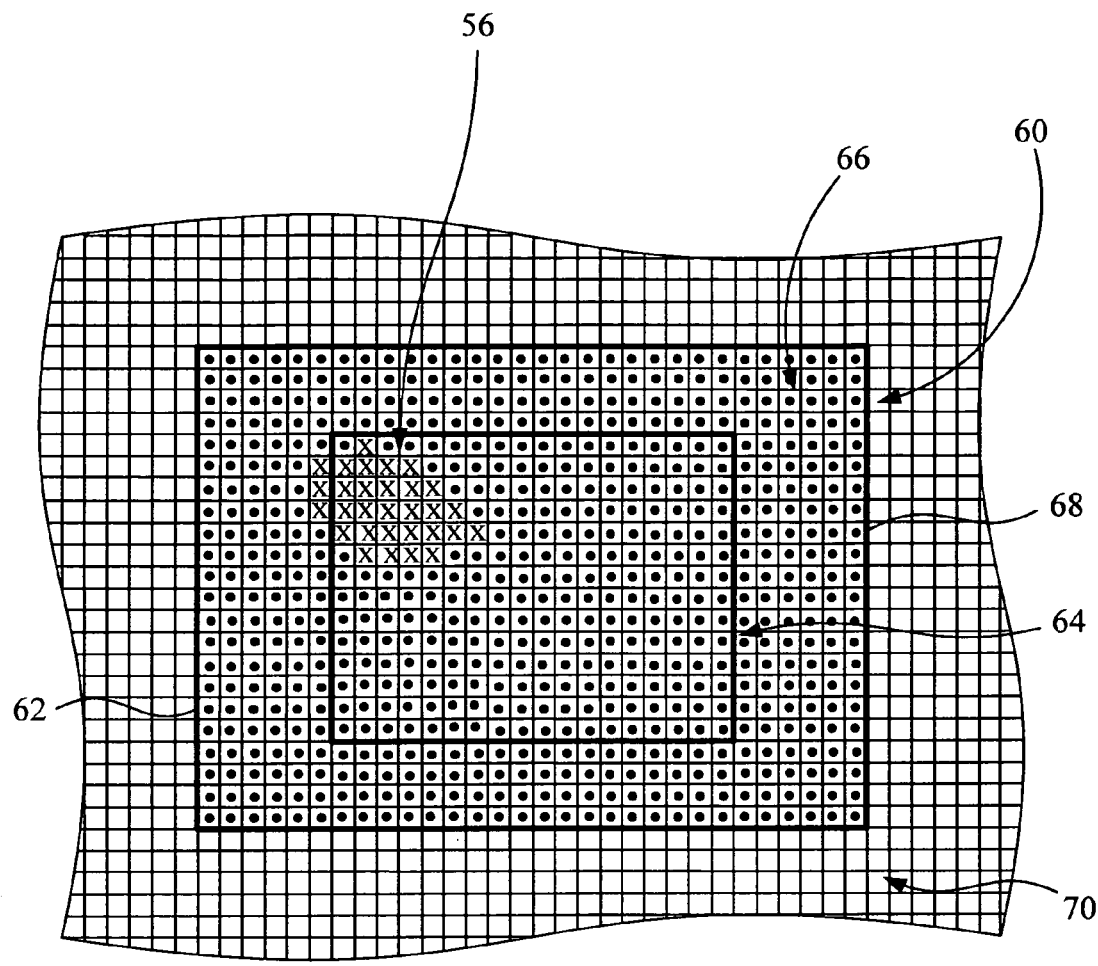
FIG. 6 illustrates a correction area and a surrounding area as a pixel grid.

At step S114, and referring to FIG. 6, the correction area 60 defined by window 62 is divided into a core region 64 and a peripheral region 66, wherein peripheral region 66 has an outer perimeter 68. FIG. 6 shows correction area 60 and the surrounding area 70 as a pixel grid. The dots and x's in the pixel grid of FIG. 6 represent the corresponding portion of image 46 in the second state 54 inside outer perimeter 68 and the open boxes in the pixel grid represent the portion of image 46 in the second state 54 that is outside perimeter 68. Also, the x's represent the undesirable artifact 56.

At step S116, a ratio is selected of core region 64 to peripheral region 66, wherein the ratio may be, for example, a variable or fixed weighting factor.

Figure 7:
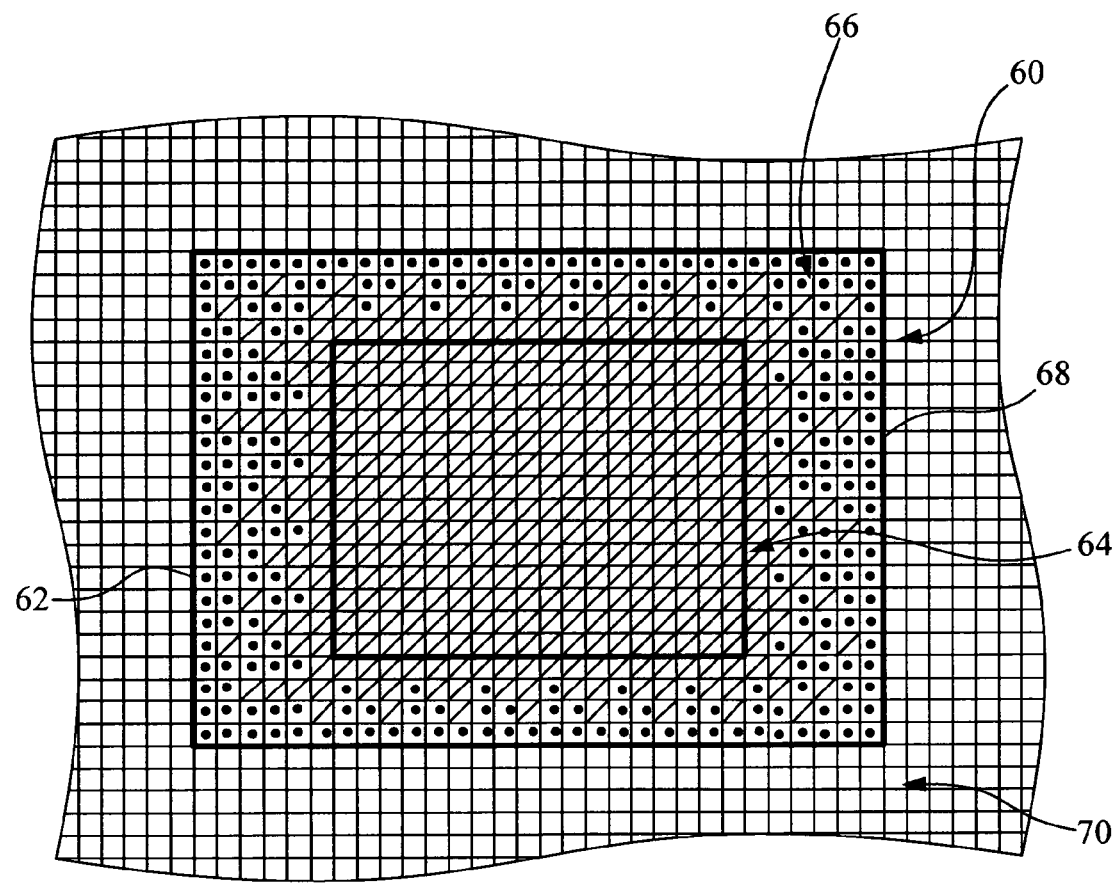
FIG. 7 illustrates a result of a blending operation applied to data associated with the correction area of FIG. 6.

At step S118, referring to FIG. 7, image data in core region 64 is replaced with corresponding image data of image 46 in the first state 48 that was previously saved in memory. The image data of image 46 in the first state 48 is represented in FIG. 7 by cross hatching At step S120, referring also to FIG. 7, image data in a first portion of the peripheral region 66 adjacent to core region 64, e.g., the pixel blocks immediately adjacent core region 64, is completely replaced with corresponding image data of image 46 in the first state 48, representing by cross hatching.

At step S122, the process transitions outward from the first portion of the peripheral region 66 adjacent core region 64 toward the outer perimeter 68 of the peripheral region 66 by replacing less and less image data in the second state 54, represented by dots, with corresponding image data of image 46 in the first state 48, represented by cross hatching, until at the outer perimeter 68 of peripheral region 66 image data of image 46 in the second state 54 is not replaced with corresponding data of image 46 in the first state 48, so as to produce a blending effect between the image 46 in the first state 48 and image 46 in the second state 54. It is noted that in FIG. 7, the undesirable artifact 56 represented by x's in FIG. 6 has been removed for the final image of FIG. 7.

In one example, the transitioning includes taking a weighted average of the corresponding data in the first state 48 and the second state 54 between core region 64 and the outer perimeter 68 of peripheral region 66, wherein more weight is given to the corresponding data in the first state 48 near core region 64 and the weight is reduced as peripheral region 66 is traversed from core region 64 to the outer perimeter 68 of peripheral region 66.

Supplemental to the above methods, in some circumstances it may be desirable for the user to apply the selective reversal multiple times in correction area 60.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for performing image editing, comprising:
displaying an image in a first state;
saving said image in said first state;
performing an operation to change said image to a second state from said first state, said second state being different from said first state;
displaying said image in said second state;
selecting from the displayed image in said second state a first area; and
reversing said operation with respect to said first area to change said first area of said image back to said first state, wherein said reversing includes:
extracting a portion of image data less than the entire image from said image in said first state that was saved that corresponds to said first area; and
inserting said portion of image data into said first area.

2. The method of claim 1, wherein a final image is a combination of said first area with said image changed back to said first state and at least a second area with said image remaining in said second state.

3. A method for performing image editing, comprising:
displaying an image in a first state;
saving said image in said first state;
performing an operation to change said image to a second state from said first state, said second state being different from said first state;
displaying said image in said second state;
selecting from the displayed image in said second state a first area; and
reversing said operation with respect to said first area to change said first area of said image back to said first state;
wherein a final image is a combination of said first area with said image changed back to said first state and at least a second area with said image remaining in said second state; and
further comprising forming a blended area such that in said first area a transition occurs between said image in said first state and said image in said second state.

4. The method of claim 1, wherein said selecting said first area includes drawing a window on said displayed image in said second state to define said first area.

5. An imaging apparatus configured for performing image editing, comprising:
a printing unit;
an input device;
a display screen; and
a processor having an associated memory, said processor being communicatively coupled to said printing unit, said input device and said display screen, said processor executing program instructions to perform:
displaying an image in a first state on said display screen;
saving said image in said first state in said memory;
performing an operation to change said image to a second state from said first state, said second state being different from said first state;
displaying said image in said second state on said display screen;
selecting from the displayed image in said second state a first area using input data received from said input device; and
reversing said operation with respect to said first area to change said first area of said image back to said first state, wherein said reversing includes:
extracting a portion of image data less than the entire image from said image in said first state that was saved that corresponds to said first area; and
inserting said portion of image data into said first area.

6. The imaging apparatus of claim 5, wherein a final image is a combination of said first area with said image changed back to said first state and at least a second area with said image remaining in said second state.

7. An imaging apparatus configured for performing image editing, comprising:
a printing unit;
an input device;
a display screen; and
a processor having an associated memory, said processor being communicatively coupled to said printing unit, said input device and said display screen, said processor executing program instructions to perform:
displaying an image in a first state on said display screen;
saving said image in said first state in said memory;
performing an operation to change said image to a second state from said first state, said second state being different from said first state;
displaying said image in said second state on said display screen;
selecting from the displayed image in said second state a first area using input data received from said input device; and
reversing said operation with respect to said first area to change said first area of said image back to said first state;
wherein a final image is a combination of said first area with said image changed back to said first state and at least a second area with said image remaining in said second state; and
further comprising forming a blended area such that in said first area a transition occurs between said image in said first state and said image in said second state.

8. The imaging apparatus of claim 5, wherein said selecting said first area includes drawing a window on said displayed image in said second state to define said first area.

9. A method for performing image editing, comprising:
displaying an image in a first state;
saving said image in said first state;
performing an operation to change said image to a second state from said first state, said second state being different from said first state;
displaying said image in said second state;
selecting a first area of said image in said second state;
dividing said first area into a core region and a peripheral region, said peripheral region having an outer perimeter;
replacing data in said core region with corresponding data of said image in said first state;
replacing data in a first portion of said peripheral region adjacent to said core region completely with corresponding data of said image in said first state; and
transitioning outward from said first portion of said peripheral region toward said outer perimeter of said peripheral region by replacing less and less data in said second state with corresponding data of said image in said first state until at said outer perimeter of said peripheral region data of said image in said second state is not replaced with corresponding data of said image in said first state, so as to produce a blending effect between said image in said first state and said image in said second state.

10. The method of claim 9, wherein said transitioning includes taking a weighted average of said corresponding data in said first state and said second state between said core region and said perimeter of said peripheral region, wherein more weight is given to corresponding data in said first state near said core region and said weight is reduced as said peripheral region is traversed from said core region to said perimeter.

* * * * *